United States Patent [19]

Littlejohn

[11] 4,249,403
[45] Feb. 10, 1981

[54] BATTERY LOCKING MEANS

[76] Inventor: Calvin Littlejohn, 901 E. Harvey Ave., Fort Worth, Tex. 76104

[21] Appl. No.: 60,469

[22] Filed: Jul. 25, 1979

[51] Int. Cl.³ .............................................. E05B 73/00
[52] U.S. Cl. ........................................ 70/230; 70/258
[58] Field of Search ................... 70/14, 57, 58, 229, 70/230, 258; 180/68.5

[56] References Cited

U.S. PATENT DOCUMENTS

| 1,806,124 | 5/1931 | Smith | 70/230 |
| 2,791,898 | 5/1957 | Pegg | 70/258 |
| 3,498,400 | 3/1970 | Hysmith | 70/258 |
| 3,752,254 | 8/1973 | Carley | 70/258 |

Primary Examiner—Robert L. Wolfe
Attorney, Agent, or Firm—Arthur F. Zobal

[57] ABSTRACT

A battery locking means comprising two nuts adapted to be threaded to the top ends of two battery hold down posts respectively located on opposite sides of the battery. One of the nuts has a single chain link attached thereto and the other nut has attached thereto a chain link of a length of chain. The length of the chain is sufficient to extend over the battery to allow one of its links to fit around a single link of chain whereby the shackle of a padlock may be inserted through the single link to prevent removal of the battery.

2 Claims, 3 Drawing Figures

U.S. Patent
Feb. 10, 1981
4,249,403
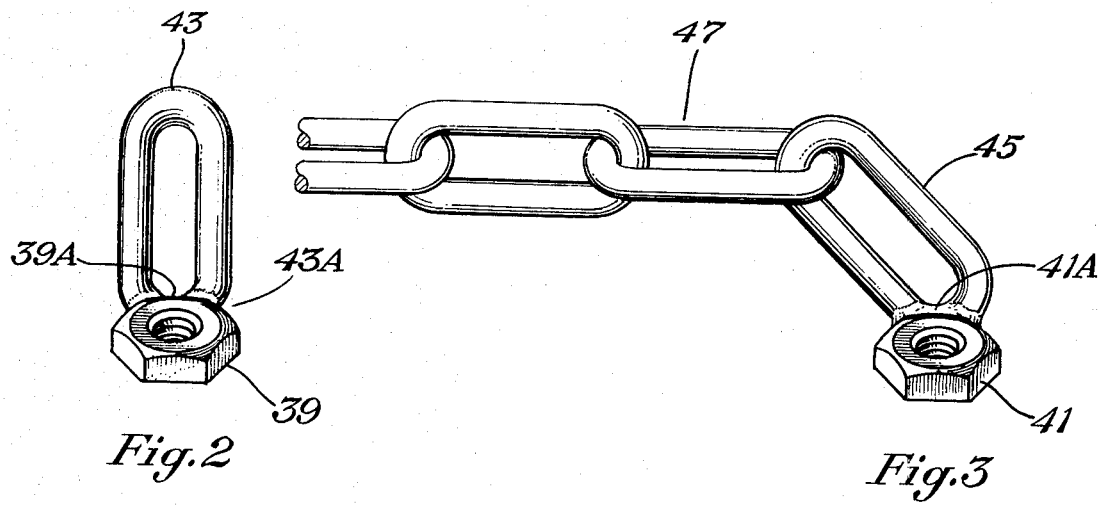
Fig.2
Fig.3
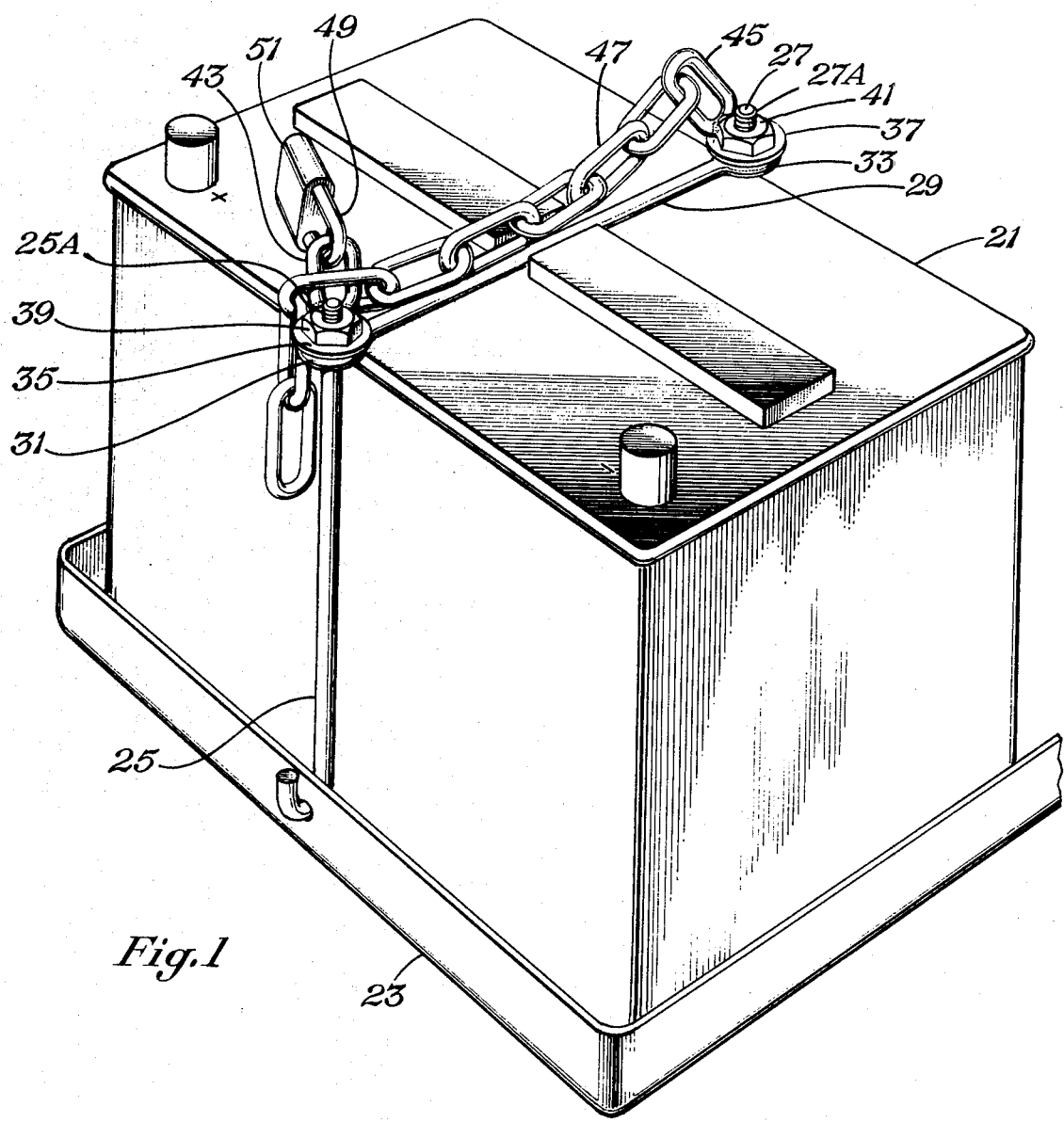
Fig.1

BATTERY LOCKING MEANS

FIELD OF THE INVENTION

The present invention relates to a device for locking the battery of a motor vehicle to prevent theft thereof.

SUMMARY OF THE INVENTION

It is an object of the present invention to provide a simple and economical means for locking the battery of a motor vehicle in place and which employs off the shelf components.

The battery locking means comprises two nuts adapted to be threaded to the tope ends of battery hold down posts. respectively located on opposite sides of the battery. One of the nuts has a single chain link attached thereto. The other of the nuts has attached thereto a chain link of a length of chain. The length of chain is sufficient to extend over the battery to allow one of its links to fit around said single link of chain whereby the shackle of a padlock may be inserted through said single link to prevent removal of the battery.

BRIEF DESCRIPTION OF DRAWINGS

FIG. 1 is a perspective view of the locking means of the present invention shown locking the battery of a motor vehicle to its supporting tray.

FIGS. 2 and 3 are enlarged views of two components of the present invention.

DESCRIPTION OF THE PREFERRED EMBODIMENTS

Referring now to the drawing, reference numeral 21 identifies a conventional battery of a motor vehicle such as an automobile, truck, etc. The battery is supported by a tray 23 secured to the motor vehicle by means not shown. Two posts 25 and 27 have their lower ends attached to opposite sides of the tray and extend upward on opposite sides of the battery. A member 29 having two hooks or looped shaped ends 31 and 33 is provided for clamping the upper ends of the posts 25 and 27 together thereby clamping the battery to the tray. As shown, loop 31 fits around the top of posts 25 and loop 33 fits around the top of post 27. Two washers 35 and 37 are fitted around the tops of posts 25 and 27 and two nuts 39 and 41 are threaded to the threads 25A and 27A formed at the tops of posts 25 and 27 for securely clamping the battery 21 to the tray 23.

Nut 39 has a chain link 43 welded thereto and nut 41 has a link 45 of a length of chain 47 welded thereto. The chain 47 has a length sufficient to fit over the top of the battery to allow one of its links to fit around link 43 whereby the shackle 49 of a padlock 51 may be fitted through link 43. When the padlock is locked in the position shown in FIG. 1, the chain 47 and hence the battery 21 cannot be removed.

The link 43 is cut from chain 47 and its cut end 43A is welded to one side of 39A of nut 39 such that the thin plane of the link 43 is parallel to the side 39A of the nut and its elongated axis is perpendicular to the thin plane of the nut. Link 45 is welded to one side 41A of nut 41 such that the thin plane of the link 45 is parallel to the side 41A and the elongated axis of the link 45 forms an angle of about 45° with respect to the thin plane of the nut 41. The link 43 extends up when the nut 39 is threaded to post 25 to facilitate reception of a link from chain 47. The nut 41 is threaded to post 27 sufficient such that link 45 points toward post 25 to facilitate extention of the chain 47 toward the post 25 and hence toward the link 43.

As thus can be understood, the locking device is effective in locking the battery in place and it can be economically produced from standard off the shelf components.

I claim:

1. A battery locking means, comprising:
   two nuts adapted to be threaded to the top ends of two battery hold down posts respectively located on opposite sides of the battery,
   one of said nuts having a single chain link attached thereto,
   the other of said nuts having attached thereto a chain link of a length of chain,
   said length of chain being sufficient to extend over said battery to allow one of its links to fit around said single link of chain whereby the shackle of a padlock may be inserted through said single link of chain to prevent removal of the battery.
2. The battery locking means of claim 1, wherein:
   said single link of chain is attached to one side of said one nut such that the thin plane of said single link of chain is generally parallel to said one side and its elongated axis is generally perpendicular to the thin plane of said one nut,
   said chain link of said length of chain is attached to one side of said other nut such that the thin plane of said chain link of said length of chain is generally parallel to said one side of said other nut and its elongated axis forms an angle with the thin plane of said other nut which is about 45°.

* * * * *